United States Patent [19]
Kawand et al.

[11] Patent Number: 5,425,484
[45] Date of Patent: Jun. 20, 1995

[54] REMOVABLE INSULATING JACKET FOR BOTTLE ATTACHED TO A BAR

[75] Inventors: John G. Kawand, 35 E. Curlis Ave., Pennington, N.J. 08534; Richard N. Brooks, Miami Beach, Fla.

[73] Assignee: John G. Kawand, Kendall Park, N.J.

[21] Appl. No.: 66,892

[22] Filed: May 21, 1993

[51] Int. Cl.⁶ .............................................. B62J 7/00
[52] U.S. Cl. ................... 224/32 R; 224/39; 224/35; 62/457.4; 220/903
[58] Field of Search ................ 224/32 R, 39, 34, 35, 224/36, 42.01; 220/903, 739; 62/457.3, 457.4

[56] References Cited

U.S. PATENT DOCUMENTS

| 707,634 | 8/1902 | Place . | |
|---|---|---|---|
| 1,950,505 | 3/1934 | Matters | 220/903 X |
| 3,120,319 | 2/1964 | Buddrus | 220/903 X |
| 4,193,525 | 3/1980 | Sommers . | |
| 4,399,668 | 8/1983 | Williamson | 62/457.4 |
| 4,809,890 | 3/1989 | Tsigadas | 224/32 R |
| 4,823,974 | 4/1989 | Crosser | 62/457.3 |
| 4,838,466 | 6/1989 | Holmstrom | 220/903 X |
| 4,871,597 | 10/1989 | Hobson | 220/903 X |
| 4,883,205 | 11/1989 | Saelens et al. | 229/32 R |
| 4,974,741 | 12/1990 | Gustafson et al. | 220/739 |
| 4,989,418 | 2/1991 | Hewlett | 62/457.4 |
| 5,007,566 | 4/1991 | Fick | 224/32 R |
| 5,040,709 | 8/1991 | Neugent | 224/35 |
| 5,048,734 | 9/1991 | Long | 220/903 X |
| 5,169,025 | 12/1992 | Guo | 220/739 |
| 5,188,877 | 2/1993 | Magano | 62/457.4 X |

FOREIGN PATENT DOCUMENTS

| 2620089 | 3/1989 | France | 62/457.4 |

*Primary Examiner*—Ernest G. Cusick
*Attorney, Agent, or Firm*—Donald N. Timbie

[57] ABSTRACT

A removable insulating jacket for the body section and funnel section of a bottle carried in a cage affixed to a bar of a bicycle in which the insulation for the body section is formed from foam having skin on at least one surface that is compressed to form flaps that are used to secure that portion to the bar and tabs for closing off the rear end. The insulation for the funnel section is formed from an arcuate sheet of foam that is connected end to end to form a frustum having ridges therein to enable a cyclist to obtain a good grip thereon when the bottle is to be removed from the cage.

33 Claims, 7 Drawing Sheets

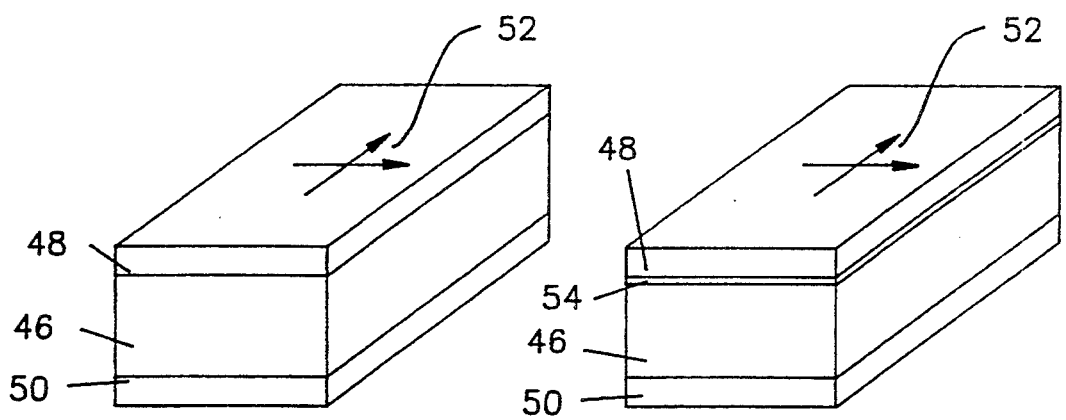
FIG. 3A
FIG. 3B
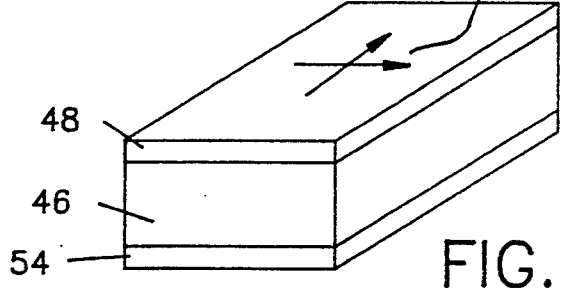
FIG. 3C
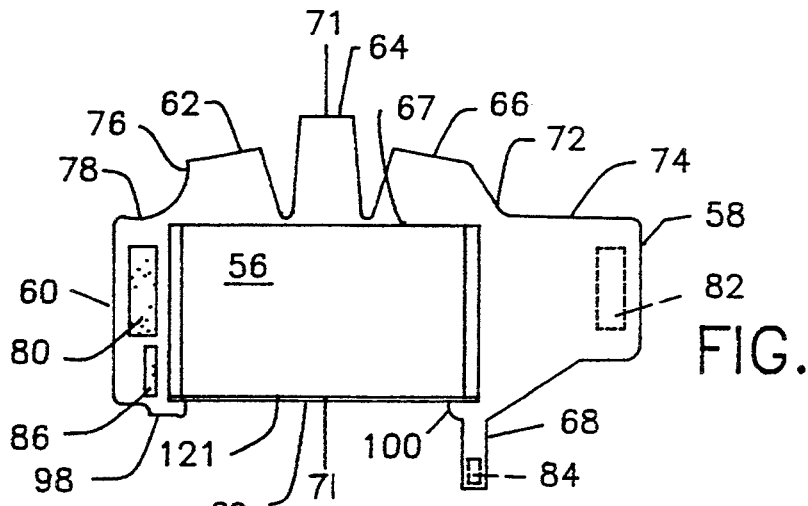
FIG. 4A
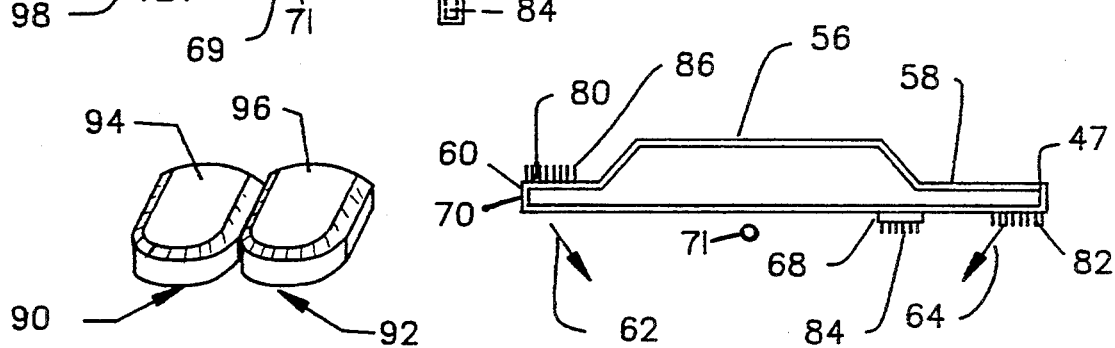
FIG. 4C
FIG. 4B

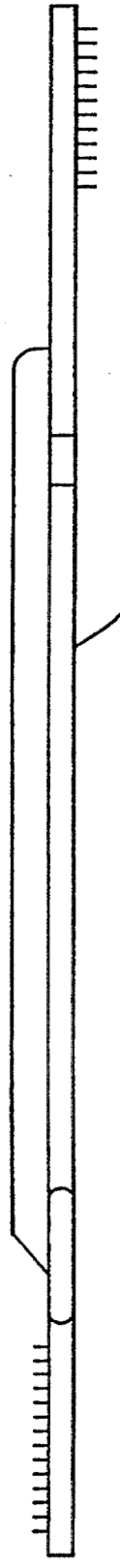
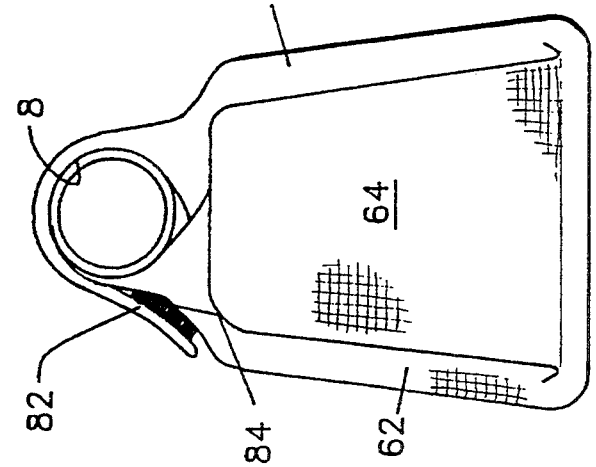
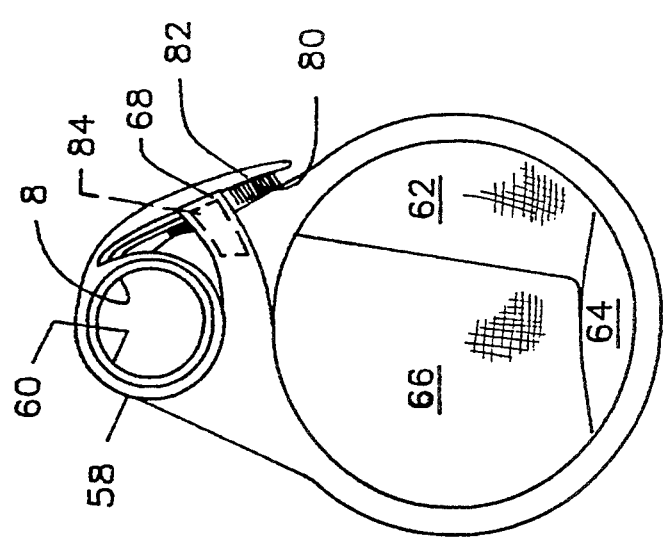
FIG. 4E
FIG. 7B
FIG. 6
FIG. 5

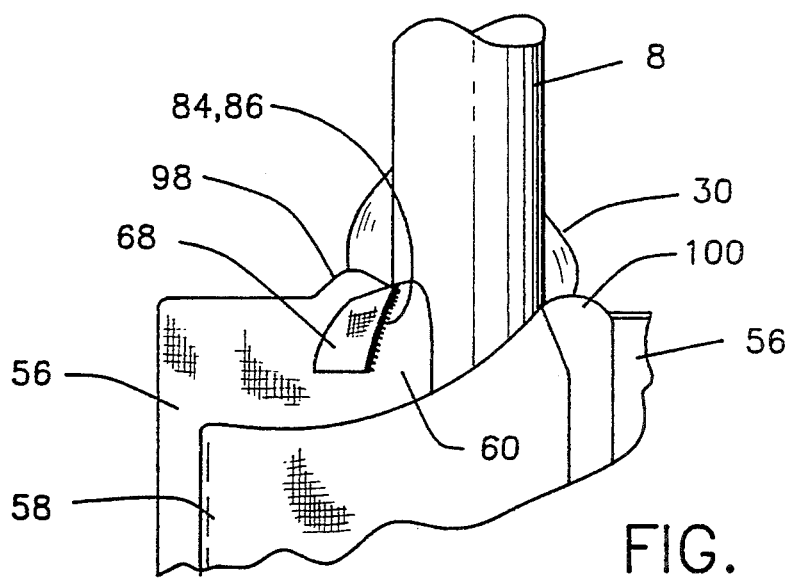
FIG. 7A
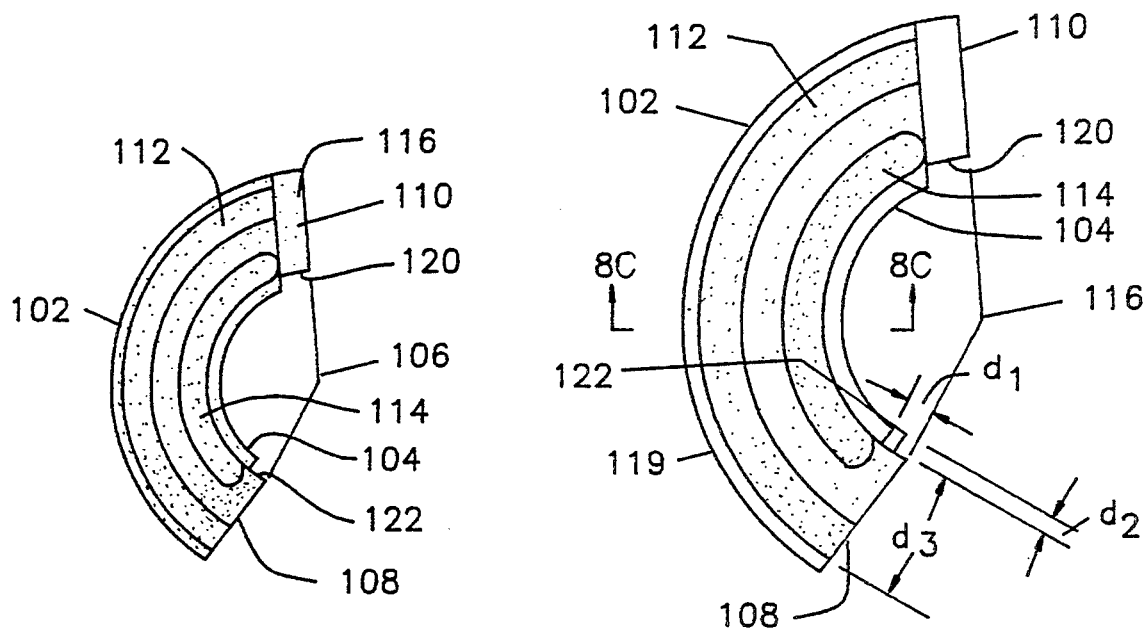
FIG. 8A
FIG. 8B
FIG. 8C

REMOVABLE INSULATING JACKET FOR BOTTLE ATTACHED TO A BAR

BACKGROUND OF THE INVENTION

Cyclists on self driven bicycles often take bottles of liquid with them to quench their thirst. In order to minimize weight and to carry as much liquid as possible without too much bulk, the bottles are usually made of thin plastic having little if any thermal insulation value. Whereas, the temperature of the liquid does not change too much during short trips, it becomes too hot or cold on trips of ½ hour or longer.

It has been customary for a bottle to be nestled in a flexible cage that is securely attached to a bar of the bicycle. In U.S. Pat. No. 4,883,205 entitled "Insulated Bottle Rack Apparatus for Bicycles" that was issued to William R. Saelens et al on Nov. 28, 1989, just the body portion of the bottle is insulated by a hollow cylindrical sleeve of insulating material having a closed end. The sleeve fits over the cage and between the cage and the bar to which the cage is attached by bolts. Openings are formed in the sleeve through which the bolts are passed. No provision is made for insulating the top of a bottle held within the cage. Furthermore, there is an opening in the closed end that permits air to flow in between the insulation and the bottle so as to reduce the insulating effect. In situations where insulation is not required, one must inconveniently remove the bolts before the insulating sleeve can be removed.

BRIEF SUMMARY OF THE INVENTION

In accordance with this invention, an insulating jacket for a bottle held within a cage that is secured to a bar of a bicycle is comprised of a body portion for insulating the body of the bottle and a separate top portion for insulating the top of the bottle, both of which are easily put in place or removed. The portions are formed from respective patterns cut from insulating material. Preferably, however, the patterns are cut and formed from a laminate of thermally compressible foam and skin adhered to at least one surface thereof.

One pattern for the body portion includes a generally rectangular area where the foam has its maximum thickness, flaps extending from opposite ends of the area, tabs extending from one side of the area and a strap extending from the other side. In the area of the flaps, tabs and strap, the thickness of the foam is preferably reduced by the application of heat and pressure. The pattern can be inexpensively made by stamping with a die that cuts the laminate to the desired shape while at the same time providing the pressure required for reducing the thickness of the flaps, tab and strap.

As will be more fully explained with the aid of the drawings, the body portion of the insulating jacket is formed from the pattern just described by bringing the flaps toward each other and adhering the tabs in overlapped relationship so as to form the bottom of a pocket for enclosing the cage. The body portion is retained in position by passing the flaps over the bicycle bar and attaching them to each other, as by patches of Velcro ® or Aplix ®. The sides of the flaps that are nearer the bottom formed by the tabs are shaped so as to fit snugly against the underside of the bar to which the cage is attached so as to prevent air currents from flowing into the jacket and cooling the bottle.

Alternatively, the tabs that form the bottom of the body portion of the pattern are eliminated and the bottom is formed by a panel affixed to the pattern in any suitable manner, as by adhesive. The sides of the flaps nearer the bottom need not be shaped so as to fit the bar as previously described and can be mere extensions of respective sides of the rectangular area. With the flaps shaped in this manner, the space under the bar is filled with a spongy substance that is preferably attached to the panel.

The pattern for the top portion of the jacket has an arcuate shape having sides defined by spaced concentric arcs and ends at different radii. Spaced ridges of full thickness are formed along the sides.

As will be more fully explained with the aid of the drawings, the top portion of the jacket is formed from the pattern just described by joining the ends of the pattern so as to form a hollow frustum. The ridges are respectively adjacent the smaller and larger ends of the frustum.

The standard bottle with which the insulating jacket of this invention is to be used has a plastic cap with a tab extending from one side to aid in opening the cap when the bottle is being filled and a flexible hinge extending from the other side of the cap to a plastic ring on the bottle so as to prevent the cap from being lost. The smaller end of the frustum bears against both the tab and the hinge so as to be retained in position. Because the hinge is closer to the bottom of the bottle than the tab, the frustum would not be coaxial with the bottle if a notch were not provided at its smaller end in accordance with an aspect of the invention. During use, a cyclist grabs the frustum and pulls the bottle from the cage so that the frustum remains with the bottle. The annular ridges provide an excellent grip.

In order to prevent the body portion of the jacket from sliding toward its closed end and to further prevent air from flowing into the jacket, an insert is provided that fits between the front of the cage and the bar so as to bear against the strap.

In accordance with another aspect of the invention, the laminate from which the insulating jacket is formed includes a foil or other infrared reflecting material so as to improve its insulating quality.

Even though the foam may be of the closed cell type so as to better resist dirt and stain, it is preferable, in accordance with another aspect of this invention to seal the skins together by application of pressure along all edges of the laminate pattern from which the body and top portions of the jacket are formed. If there is only an outer skin, it is rolled over so that the foam is hardly visible in an edge view. The resistance to dirt and stain is further reduced by judicious selection of the material from which at least the outer skin laminate is made. The use of an outer skin also makes it possible to use decorative patterns or color and to increase safety by making it of light reflective material.

As will be more clearly understood from the following detailed description of the drawings, an insulating jacket of this invention may be readily attached for use and easily removed without tools while at the same time providing good thermal insulation and shielding the bottle from air currents.

Because of its structure, fabrication of an insulating jacket of this invention is simple and inexpensive. As foam is drawn from a roll, skin can be adhered to one or both sides as desired after the surface of the foam is heated by flame. If the foam is made of polyethylene, the laminate is heated in an oven and a cold die is brought down on the laminate so as to cut out the desired pattern and reduce its thickness where desired. On the other hand, if the foam is made of polyurethane, the entire process can be carried out by a heated die on laminate at room temperature.

BRIEF DESCRIPTION OF THE DRAWINGS

FIGS. 3A and 3B and 3C illustrate laminates from which an insulating jacket of this invention may be fabricated;

FIGS. 4A and 4B are respective top and edge views of one pattern of material that has been cut and formed so that the body portion of an insulating jacket of this invention can be fabricated therefrom;

FIG. 4C is a view of pieces from which an insert may be formed;

FIG. 4E is an edge view of FIG. 4A';

FIG. 5 is an external view of the top of a body portion of an insulating jacket of the invention showing how it is secured to a bar of a bicycle but with the cage omitted;

FIG. 6 is an external view of the bottom of a body portion of an insulation jacket of this invention showing how it is secured to a bar of a bicycle;

FIG. 7B is the same as FIG. 5 except that the cage is shown and a strap is not secured;

FIG. 7A is a view of the front of the body portion of the insulating jacket looking from the remote side of the bar to which the cage is attached;

FIG. 8A shows the cut and formed pattern from which the frustum for insulating the top of a bottle is formed;

FIG. 8B is an enlargement of FIG. 8A showing certain suggested dimensions and radii;

FIG. 8C is a cross section AA of FIG. 8';

DETAILED DESCRIPTION OF THE DRAWINGS

Figure 1:
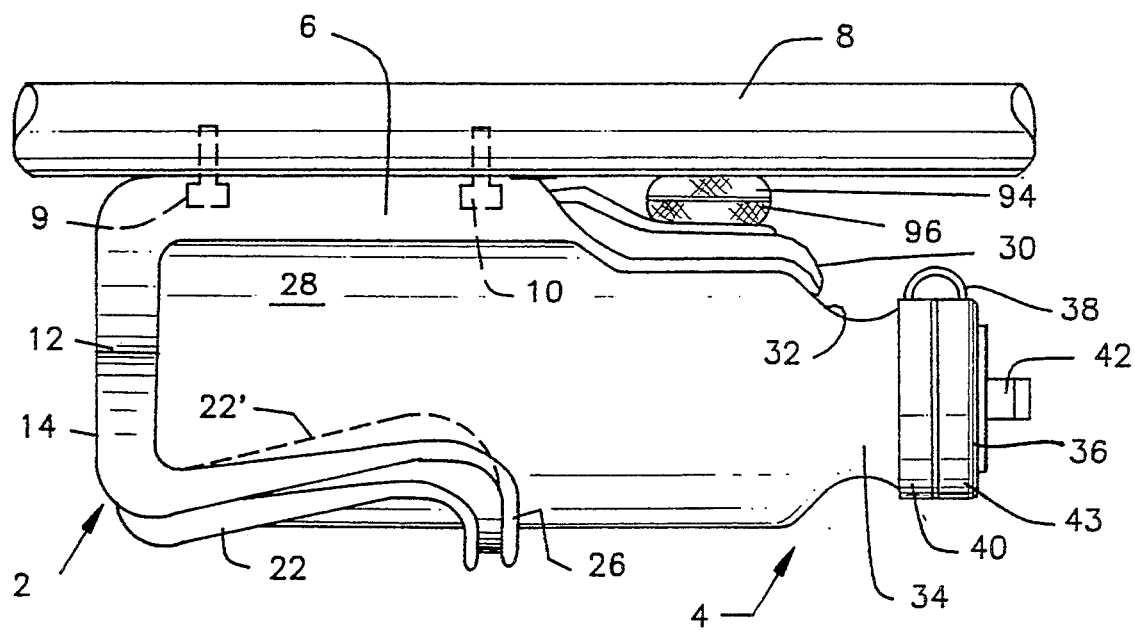
FIG. 1 is a side view of a cage secured to a bar of a bicycle with a bottle retained therein.
Figure 2:
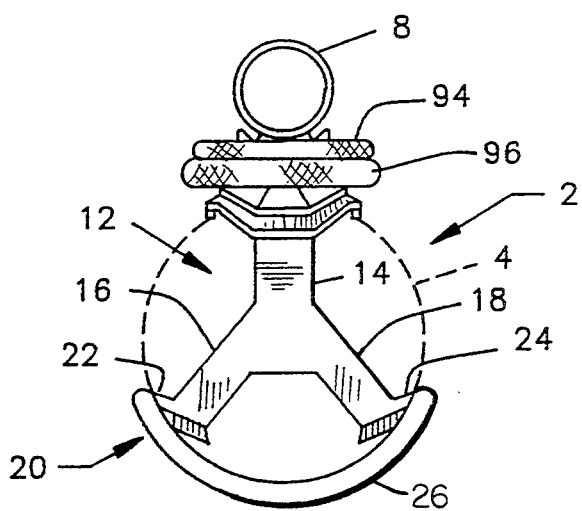
FIG. 2 is a view of a cage secured to a bar of a bicycle looking toward the front end where the top of a bottle will be.

Reference is made to FIGS. 1 and 2 for a description of a cage 2 and a bottle 4 of the type that are to be encased within an insulating jacket of this invention. In the following description, the word "top" refers to the end of a cage or body portion of the jacket that is nearer the top of a bottle and "bottom" refers to the opposite ends that are nearer the bottom of a bottle. The cage 2 is comprised of a member 6 that is parallel to a bicycle bar 8 and attached thereto in any suitable manner as by recessed screws 9 & 10, a bottom 12 that as seen in FIG. 2 is in the form of an upside down "Y" having a stem 14, arms 16 and 18 and a bottle cradle 20 attached to the ends of the arms 14 and 16. The cradle 20 is comprised of divergent side members 22 and 24 that respectively extend forwardly and upwardly from the ends of the arms 16 and 18 and an arcuate member 26 between the ends of the side members 22 and 24. Before the bottle 4 is inserted in the cradle 20, the side members 22 and 24 and the arcuate member 26 are in a raised position so that, as seen in FIG. 1, the top of the side member 22 has the position indicated by the dashed line 22'. Then, when the body section 28 of the bottle 4 is inserted into the cage 2, it is gripped by the spring action of the cradle 20 and forced into contact with the member 6 and a tongue 30 that extends forwardly from the member 6 so as to fit over a funnel section 32 at the top of the bottle 4. The tongue 30 prevents the bottle 4 from being inadvertently moved forward. The funnel section 32 ends in a spout 34. The spring action of the cradle 20 is strong enough to prevent the bottle 4 from flying out of the cage 2 when a severe bump is encountered but not so strong as to prevent it from being easily withdrawn when the cyclist desires a drink.

A cap 36 snaps over the open end of the spout 34 so as to close it, and a flexible hinge 38 is connected between the cap 36 and a ring 40 that is firmly mounted on the spout 34 so as to prevent the cap from being lost. A valve 42 is provided in the cap 36 that can be opened by the cyclist tugging on it with his or her teeth so as to permit fluid to flow from the bottle 4. A projection 43 from the cap 36 is diametrically opposite the hinge 38 so as to make it easier to remove the cap 36 when filling the bottle 4.

The body and top portions of an insulating jacket of this invention may be respectively made from a single sheet of insulating material, but are preferably made from sheets in the form of laminates such as shown in FIGS. 3A, 3B or 3C in which layers of corresponding material are indicated by the same numbers. The laminate of FIG. 3A is comprised of a central layer 46 of foam made, for example, from polyethylene or polyurethane and skins 48 and 50 that are adhered to the opposite surfaces thereof by heating them with a flame just before they are applied. In a somewhat less expensive version, only one skin is provided, but, in either case, it is preferable that the skin have a two way stretch as indicated by the arrows 52 in order that it may more readily form corners and curved surfaces during a thermoforming process to be described. Significant improvement can be made in the insulating effect of the jacket by incorporating a layer 54 of infrared reflecting material such as a metal foil anywhere in the laminate. In FIG. 3B a lamination 54 of metal foil is shown between the skin 48 and the foam 46, but in FIG. 3C it replaces the skin 50. In either case it may be adhered as required by a wet lamination process.

Since one of the skins 48, 50 will be on the outside of the jacket and the other on the inside, they can be different. For example, the outer skin could have decoration designs and be chemically treated so as to resist soiling. In interest of safety the outer skin could be made in accordance with an aspect of this invention so as to reflect light.

The skins 48, 50 are preferably made of cloth because it is inexpensive and lends itself to being printed with decorative designs or treated so as to reflect light, but they could be made of plastic extruded on the surface of the foam 46 or on the top of cloth.

Figure 4D:
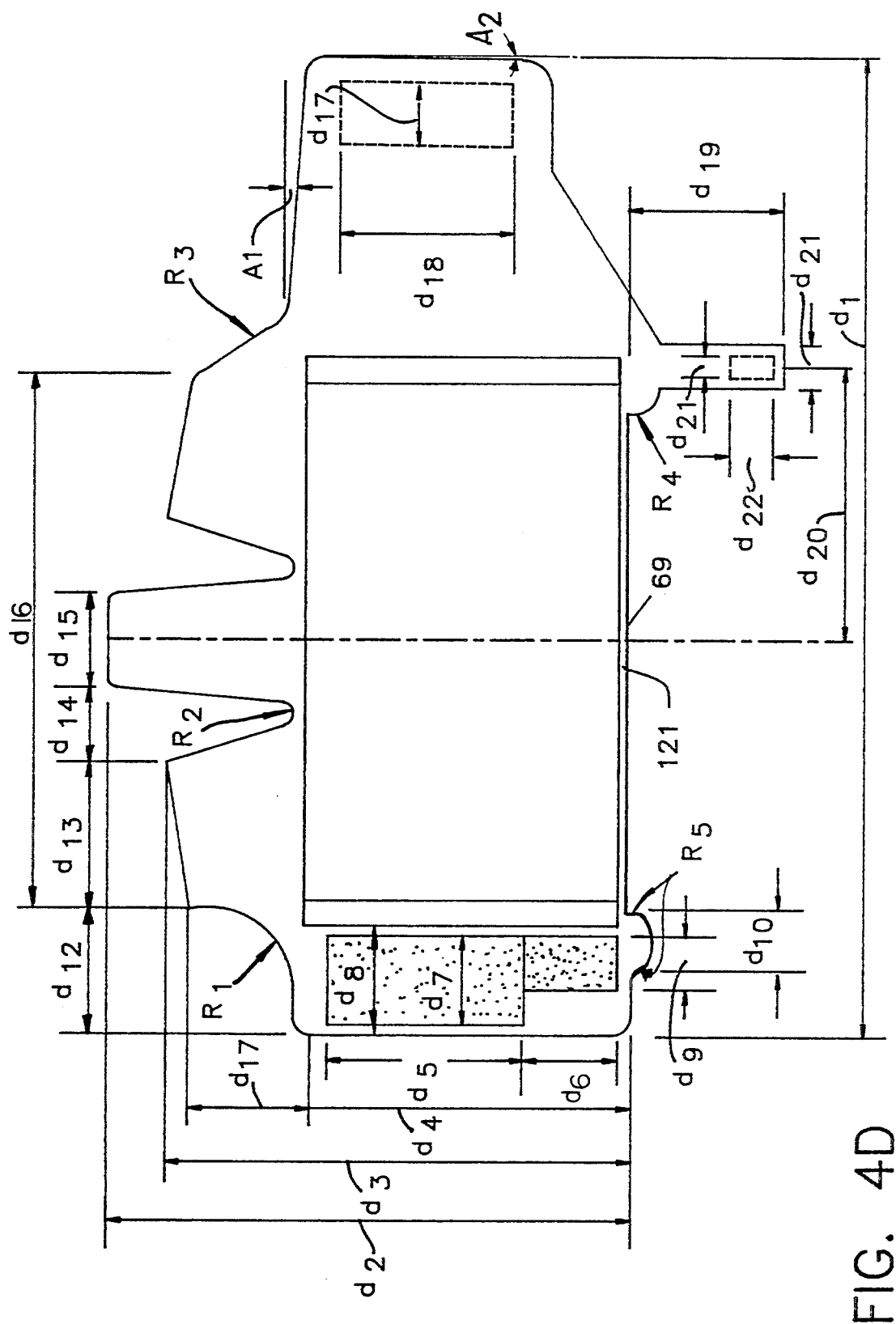
FIG. 4D is an enlargement of FIG. 4A showing certain suggested dimensions and radii.

Reference is now made to FIGS. 4A and 4B illustrating a pattern for making the body portion of the insulating jacket that is to insulate the body section 28 of the bottle 4. The pattern can be formed by a thermoforming process that cuts it out and compresses it in all areas except for a central area 56, herein shown as being rectangular. Flaps 58 and 60, respectively extend from opposite ends of the area 56, tabs 62, 64 and 66 extend from a first side 67 of the area 56 and a strap 68 extends from the second side 69 of the area 56. Preferably, the edges of one skin are rolled over toward the other side of the layer of foam 46, as indicated at 70 in FIG. 4B, so that the foam is hardly visible, thus eliminating a surface that might show soil. The edge view of FIG. 4B shows that the flaps 58 and 60 are thinner than the central area 56.

In forming the body portion of the jacket that insulates the body section 28 of the bottle 4, the pattern of FIG. 4A is folded, as indicated by arrows 62 and 64 of FIG. 4B, about an axis 71 that is transverse to the first and second sides 67 and 69 of the area 56, thereby bringing the flaps 58 and 60 toward each other. FIGS. 5 and 6 are views of the top and bottom ends respectively of the body portion of the jacket as they would appear when in use. The cage 2 is not shown in FIG. 5 in order to more clearly illustrate the inside view of the tabs 62, 64 and 66. The folding of the pattern creates generally "U" shaped openings at each end. The tabs 62 and 66 are on the sides of one opening and the tab 64 is at the bottom thereof. They are folded over each other in an overlapped relationship and adhered by glue or other means so as to form the bottom of a pocket for surrounding the cage 2.

The shape of an edge 72 of the tab 66 and the shape of an edge 74 of the flap 58 are such that they fit snugly against the bar 8 at the bottom end, and the shape of an edge 76 of the tab 62 and the shape of the edge 78 of the flap 60 are such that they fit snugly around the bar 8 at the same end, FIG. 4A. Patches 80 and 82 of Velcro ® or Aplix ® are respectively mounted on the flaps 58 and 60 for removeably holding the flaps together as will be explained.

It is apparent that the tabs 62, 64 and 66 could be overlapped differently. Although the tab structure shown is preferred because it holds the structure firmly together, other tab formations could be used. By way of example, a single tab such as 64 could be used if it were properly shaped. Its top would be curved so as to snugly fit against the bottom of bar 8.

As seen in FIGS. 5, 6, and 7 the flaps 58 and 60 can be made to hold the body portion of the jacket in place by passing them over the bar 8 and removably attaching them together. In the example shown, the flaps 58 and 60 are long enough to overlap and are held together by the patches 80 and 82 of Velcro ® or Aplix ®, as also shown in FIG. 4B, that are adhered to juxtaposed faces. Other means for removably attaching the end flaps 58 and 60 to each other could be used, but Velcro ® or Aplix ® can provide for attachment along the entire width of the flaps so as to avoid wrinkles. The strap 68 is brought under the bar 8 and removably attached to the outside of the flap 60 by patches 84 and 86 of Velcro ®, FIGS. 4A, 5 and 7, or Aplix ® on their juxtaposed surfaces. Other means of attachment could be used.

FIG. 7 is an axial view of the top of the portion of an insulating jacket that insulates the body section 28 of a bottle when mounted about a cage 2 and attached to a bar 8. The bottle is not shown, but the position of its body section 28 is indicated by a dashed circle 88. In order to simplify the drawing, the overlapped tabs 62, 64 and 66 forming the bottom of this portion are not shown, and the strap 68 is shown in an unattached position so as to reveal the front of an insert formed by adhering faces 90 and 92 of pieces 94 and 96 of FIG. 4C. Although not previously mentioned, the side view of the insert 94, 96 is shown in FIG. 1. From these views it can be seen that the insert 94, 96 is inserted between the tongue 30 and the bar 8. One purpose is to assure that there is no flow of air around the strap 68 when it is passed under the bar 8 and its patch 84 attached to the patch 86 as shown in FIG. 5. Depending on the diameter of the bicycle bar 8, the insert 94, 96 may or may not be necessary. In FIG. 7 the insert 94, 96 is not seen as being firmly in contact with the jacket, but it will be when the strap 68 is pulled under the bar 8 and attached. A further purpose is to prevent the body portion 61 from sliding down toward the bottom 12 of the cage.

When the flaps 58 and 60 are overlapped so as to securely fasten the body portion of the jacket to the bar 8, FIG. 7, the area 56 is drawn along lines tangent to opposite sides of the bottle 4, indicated by the dashed circle 88, so as to possibly create gaps through which air may flow around the insert 94, 96. As a still further assurance against air flowing into the jacket, seals 98 and 100, also shown in the pattern of FIG. 4A, are provided on the same side of the pattern as the strap 68 and respectively near the ends of the area 56. The seal 98 is preferably centered in the edge of the area 56, and the seal 100 preferably adjoins the side of the strap 68 that is nearer the center of the area 56 and the side thereof.

Reference is now made to FIG. 7A, which is a view of the front end of the portion of the jacket for insulating the body section 28 of the bottle 4 looking from the remote side of the bar 8. The strap 68 is integral with the seal 100, but extends over the top of the seal 98 before it is attached to the flap 60. When the frustum of FIG. 9, to be described, is placed onto the funnel section 32 of the bottle 4, it overlaps the seals 98 and 100 and bears against the strap 68, which, in turn, bears against the insert 94, 96.

Figure 9:
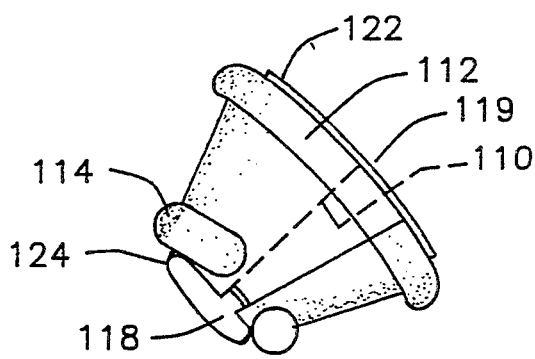
FIG. 9 is an isometric view of a frustum formed from the pattern of FIG. 8.

FIG. 8 shows a pattern to be formed from sheets of laminated material such as, for example, shown in FIGS. 3A, 3B or 3C for making the portion of an insulating jacket of this invention that insulates the funnel section 32 of the bottle 4. The pattern lies between two arcs 102 and 104 of different radii having a center 106 and two radii 108 and 110. All portions except arcuate ridges 112 and 114 are compressed. A tab 116 extends beyond one set of ends of the ridges 112 and 114. The portion of the jacket for insulating the funnel section 32 is illustrated in FIG. 9. It is formed from the pattern of FIG. 8 by adhering the tab 116 to the underside of the other end of the pattern adjacent the radii 108 so as to form a frustum. The end of the pattern of FIG. 8 at the radial line 110 is indicated by a dashed line in FIG. 9. The foam is preferably reduced to the vanishing point around all edges by applying extra pressure.

Observation of FIG. 1 shows that the flexible hinge 38 extends to a point is closer to the bottom of the bottle 4 than the tab 43 that is used to pull the cap 36 off. If the end of the ridge 114 at the smaller end of the frustum bore against the hinge 38 and the tab 43, the frustum would be cocked so that the larger ridge 112 would not mate well with the front edge of the portion of the jacket that insulates the body 28 of a bottle 4. In order to prevent the passage of air into the jacket that might result, as well as to insure that the frustum cover the entire funnel section 32 of a bottle 4, a notch 118, FIG. 9, is provided at its smaller end into which the hinge 38 fits. In the illustrated embodiment of the invention, the notch 118 is formed by the provision of rectangular notches 120 and 122 at the ends of the smaller arc 104, FIG. 8. A thin lip 119 may be formed adjacent the larger arc 102 so as to overlap a lip 121, FIG. 4A, of the body portion of the jacket, when the entire jacket is assembled.

Although the ridges 112 and 114 could be eliminated, they are preferred because they provide an effective means for obtaining a firm grip on the top of the bottle 4 that is required for its removal from the cage 2.

Figure 10:
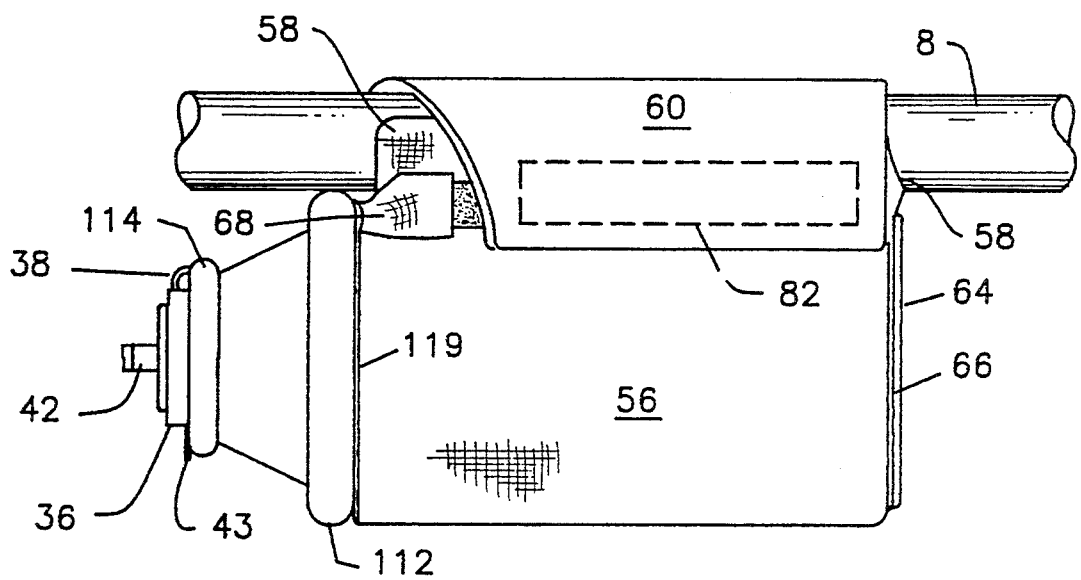
FIG. 10 is a side view of the bottom and top portion of an insulating jacket of this invention when in use.

FIG. 10 is a side view of a complete insulating jacket of this invention including the portion for insulating the body section 28 of the bottle and the portion for insulating the funnel section 32 when they are mounted for use. The small end of the frustum is kept in position by the notch indicated at 118 but not shown, engaging the strap 38 and the ridge 114 bearing against the projection 43.

FIG. 4A' is an enlarged view of the pattern of FIG. 4A for forming the portion of the jacket that insulates the body section 28 of the bottle 4, so that examples of dimensions of a jacket for covering a cage holding a standard twenty-one ounce bottle may be more clearly designated. Actually, FIG. 4A' is drawn to scale so that only one dimension d1=15.25" need be given, but in the interest of convenience, other dimensions and radii are as follows:

| | | |
|---|---|---|
| d1 = 15.25" | d11 = 1.77" | d21 = 0.75" |
| 2d = 7.50" | d12 = 1.56" | d22 = 0.625" |
| 3d = 7.31" | d13 = 2.62" | d23 = 0.625" |
| 4d = 4.91" | d14 = 1.44" | A1 = 4.0° |
| 5d = 3.5" | d15 = 1.765" | A2 = 2.0° |
| 6d = 1.25" | d16 = 9.875" | R1 = 1.25 |
| 7d = 1.5" | d17 = 1.50" | R2 = 0.25" |
| 8d = 1.625" | d18 = 3.50" | R3 = 1.25" |
| 9d = 0.625" | d19 = 2.39" | R4 = 0.5" |
| d10 = 1.24" | d20 = 4.56" | R5 = 0.3.75" |

FIG. 8' is an enlarged view of the pattern of FIG. 8 for forming the portion of the jacket that insulates the funnel section 32 of the bottle 4 so that the following dimensions and radii can be more clearly indicated. Although not shown, the dimensions of the notch 120 are the same as the dimensions for the notch 122.

| | | |
|---|---|---|
| D1 = 6.00" | d1 = 0.35 | d3 = 1.91 |
| D2 = 10.33' | d2 = 0.25 | |

FIG. 8A' is a cross section AA of FIG. 8'.

The description thus far has been related to an insulating jacket of the invention that is adapted for use with a twenty-one ounce bottle, but as is known, cyclists may use a twenty-eight ounce bottle that has the same diameter but a greater length. The larger bottle is inserted into the same cage 2 as the smaller bottle but extends farther beyond the top of the cage.

Figure 11:
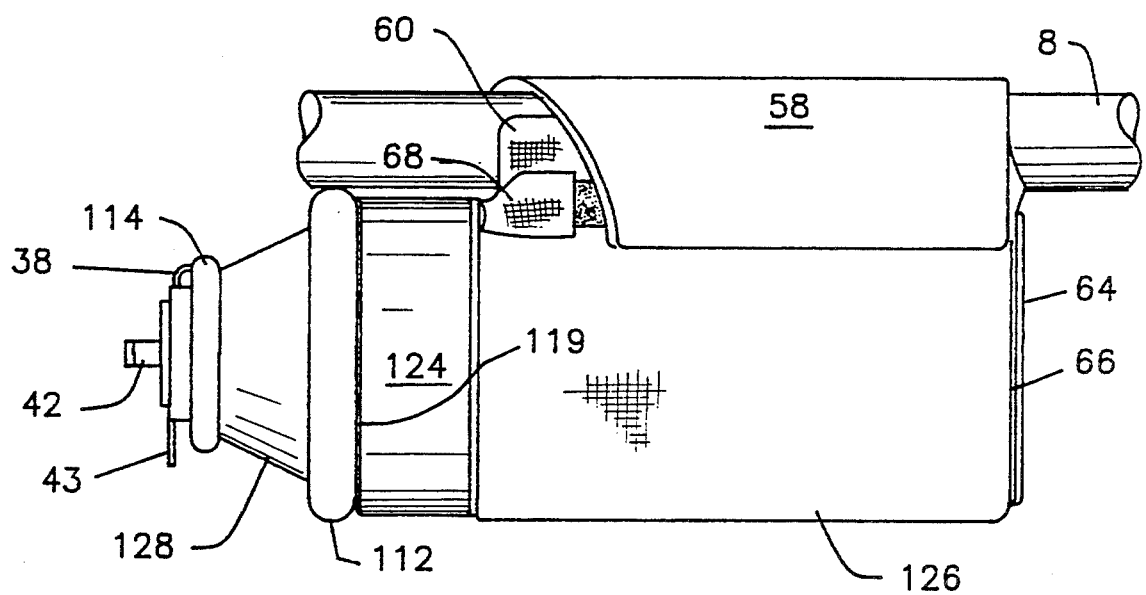
FIG. 11 is an external view of a large bottle encased by an insulating jacket having a cylindrical adapter.

In accordance with an aspect of this invention, an adapter is provided that makes it possible to use the body portion and top portion of the insulating jacket previously described for the smaller bottle to insulate corresponding portions of the larger bottle. As shown in FIG. 11, the adapter is in the form of a cylinder 124 made for example of laminated material such as shown in FIGS. 3A, 3B or 3C that fits around a bottle, not seen, and extends between a body portion 126 and a top portion 128 of the jacket that have been previously described. It could have a ridge in it, but better insulation is achieved if its thickness is not reduced to form a ridge.

Figure 12:
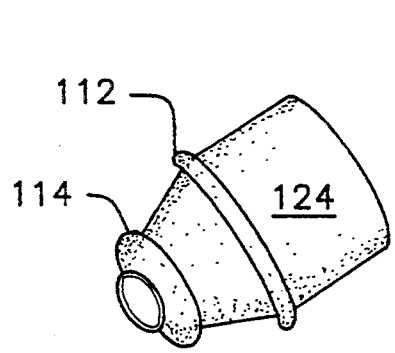
FIG. 12 is an isometric view of an adapter comprising a frustum and a cylinder for use in insulating a large bottle.

Alternatively, the adapter could be an additional top portion 128 with the cylinder 126 attached thereto in any suitable manner, as shown in FIG. 12.

Figure 13:
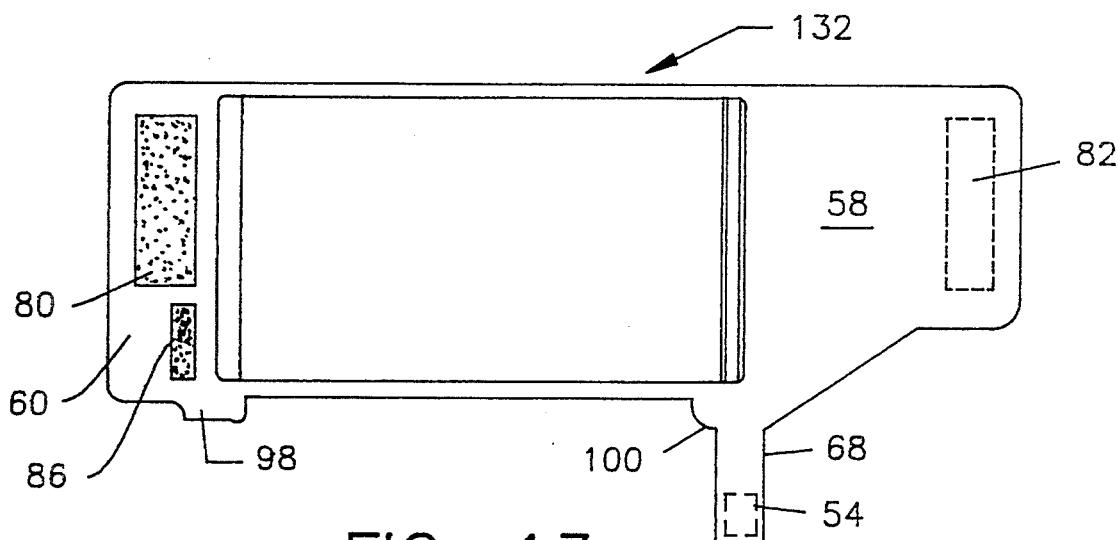
FIG. 13 illustrates an alternative pattern for the body portion of an insulating jacket not having tabs.
Figure 15:
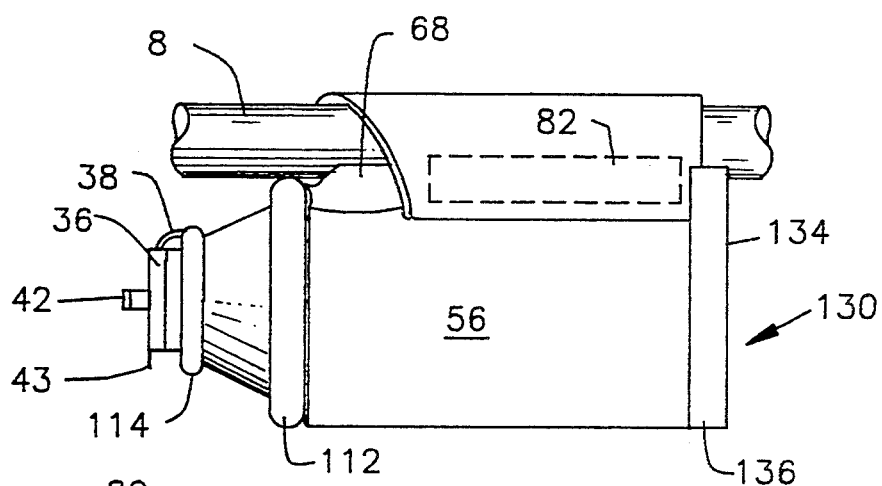
FIG. 15 is a side view of the body and top portions of an insulating jacket when the pattern of FIG. 13 is used.
Figure 14:
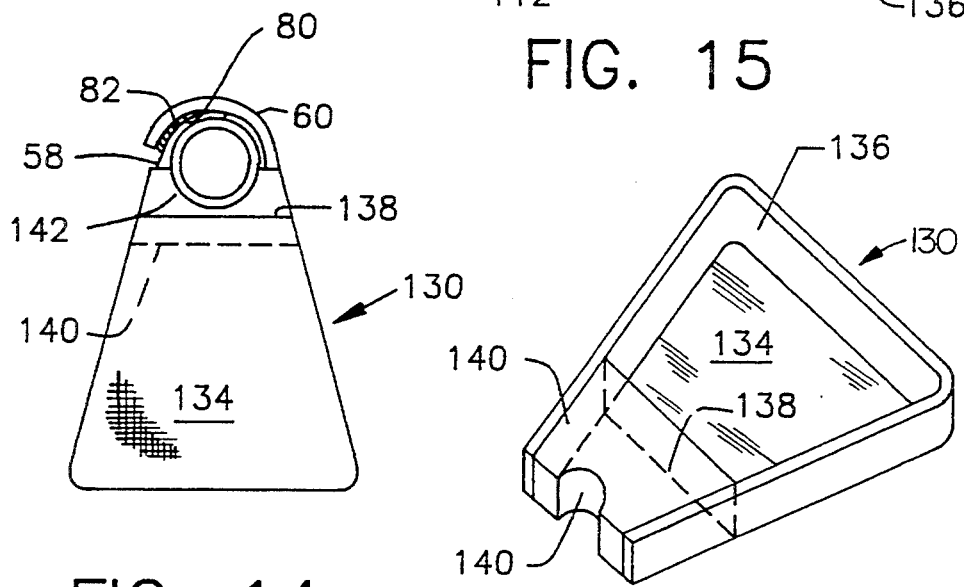
FIG. 14 is a bottom view of the body portion of an insulating jacket when the pattern of FIG. 13 is used.
Figure 16:
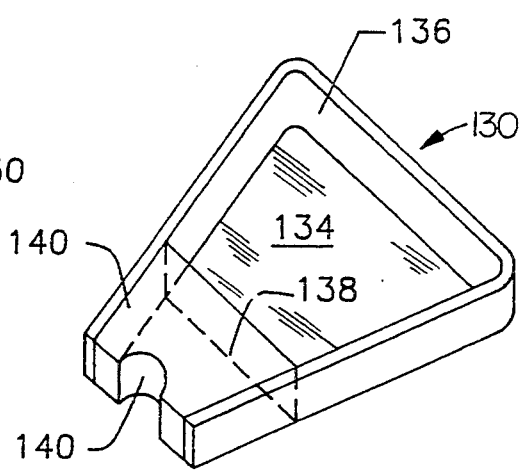
FIG. 16 is an isometric view of a bottom panel to be used when the pattern of FIG. 13 is used to form the body portion of the jacket.

Instead of using overlapped tabs such as 62, 64 and 66 of FIGS. 4A and 4A' as a means for forming the bottom of the portion of the jacket that insulates the body section 28 of the bottle 4, a panel 130 such as shown in FIGS. 14, 15 and 16 may be used. In this event, the pattern 132 shown in FIG. 13 is the same as that of FIG. 4A and 4A' except that the tabs 62, 64 and 66 are eliminated. Therefore, when the pattern 132 is wrapped around the cage 2 and the flaps 58 and 60 joined together by their patches 80 and 82 of Velcro ® or Aplix ®, there is a "U" shaped opening at the bottom shaped as the outline of the bottom shown in FIG. 6. The panel 130 is comprised of a plate 134 having the same shape as said opening. A rail 136 that is perpendicular to the plate extends around its edge and beyond its smaller end 138. A seal 140 made of soft resilient material such as sponge rubber is mounted within the smaller end of the rail 136 and has a cylindrically shaped depression 142 in the end that is adapted to fit the bar 8.

We claim:

1. An insulating jacket for a bottle contained within a cage attached to a bar of the frame of a bicycle comprising:
   a sheet of material having opposing ends and opposing sides, there being a central region between said opposing ends;
   said sheet being folded about an axis transverse to said sides so as to form a pocket having generally U shaded opposed openings perpendicular to said axis, said openings having bottoms;
   at least one tab extending from a side of said sheet so as to close a portion of one of said U shaded openings adjacent to its bottom; and
   means for removably attaching said ends together when the sheet is so folded;
   whereby said pocket is adapted to enclose a cage and said ends may be attached together on the side of the bar that is remote from said cage so as to hold said pocket in place.

2. A jacket as set forth in claim 1 wherein said sheet includes thermally compressible foam that has been compressed in the area forming said at least one tab.

3. A jacket as set forth in claim 1 wherein:
   said sheet includes thermally compressible foam; and portions of said sheet adjacent said ends have been compressed to less thickness than the portion thereof extending between said end portions.

4. A jacket as set forth in claim 1 further comprising:
   a strap extending from the other of said sides at a given distance from one end of said sheet, and means for removably attaching said strap at the other side of said sheet.

5. A jacket as set forth in claim 4 wherein:
said sheet of material includes compressible foam; and
portions of said sheet adjacent said ends being compressed so as to be thinner than the central region between them.

6. A jacket as set forth in claim 1 wherein said at least one tab is thinner than said central region.

7. An insulating jacket for a bottle contained within a cage that is attached to a bar of the frame of a bicycle comprising:
a sheet of material having opposing respective ends forming first and second flaps, and having first and second sides, said sheet being folded so as to bring the flaps toward each other so that said first side of said sheet forms a first U and the second side of said sheet forms a second U, each of said U's having two sides and a bottom;
means for removably attaching said first and second flaps together so as to form a first opening with said first U and a second opening with said second U;
closure means for closing a portion of said first opening so as to define a first aperture between said closure means and said flaps when they are attached; and
detachable sealing means for dividing said second opening into a second aperture between said detachable sealing means and said flaps when they are attached and a third aperture through which a bottle can be inserted.

8. A jacket as set forth in claim 7 wherein said flaps have less thickness than the portion of said sheet extending between them.

9. A jacket as set forth in claim 7 wherein said sheet includes thermally compressible foam and said flaps are compressed.

10. A jacket as set forth in claim 7 wherein said closure means for closing a portion of said first opening is comprised of at least one tab extending from the first side of said sheet.

11. A jacket as set forth in claim 7 wherein said means for closing a portion of said first opening is comprised of a panel.

12. A jacket as set forth in claim 7 wherein said sheet of material is a laminate having a layer of foam and a layer of skin on one surface of said layer of foam.

13. A jacket as set forth in claim 12 further comprising a layer of skin on the other surface of said layer of foam.

14. A jacket as set forth in claim 12 wherein said skin is made of cloth.

15. An insulating jacket as set forth in claim 7 wherein said detachable sealing means is a strap.

16. A jacket as set forth in claim 15 wherein said strap extends from one side of said sheet at a point adjacent to one of said flaps.

17. A jacket as set forth in claim 16 wherein for a given distance along said one side of said sheet said strap is wider than the rest of the strap so as to form a seal.

18. A jacket as set forth in claim 17 wherein said closure means is a plurality of tabs including a first tab extending from one side of said first U and a second tab extending from the opposite side of said first U, said tabs having edges remote from the bottom of said first U that curve inwardly.

19. A jacket as set forth in claim 15 further comprising a piece of resilient material mounted behind said strap.

20. A jacket as set forth in claim 7 wherein said strap is thinner than said central region.

21. A jacket as set forth in claim 2 wherein there is a protuberance from said second side of said sheet that is spaced from the end of one of said flaps so as to form a seal.

22. An insulating jacket for a bottle that is to be attached to a bar comprising:
means defining a pocket adapted to receive the bottom portion of a bottle said pocket having a bottom, a top and sides;
flaps respectively extending from said sides of said pocket, said flaps having ends adapted to extend over a bar;
means for removably attaching the ends of said flaps to each other; and
removably attachable sealing means for dividing the top of said pocket into two apertures, one for a bottle and the other for a bar, said sealing means extending between said flaps at a given distance from their ends.

23. An insulating jacket as set forth in claim 22 further comprising:
a separate frustum having larger and smaller ends; and
means defining a notch in said smaller end.

24. An insulating jacket as set forth in claim 23 further comprising:
an adapter in the form of a cylinder for mounting around a bottle between said means defining a pocket and said separate frustum.

25. An insulating jacket comprising;
a separate frustum for insulating only the funnel shaped top of a bottle, said frustum having larger and smaller ends; and
means defining a notch in said smaller end.

26. An insulating jacket as set forth in claim 25 further comprising gripping means on the outside of said frustum.

27. An insulating jacket comprising:
a sheet of laminate material having a layer of thermally compressible foam and a skin on at least one surface thereof;
said sheet having flaps at the ends thereof, a plurality of tabs extending from a first side of said sheet and a strap extending from the second side of said sheet and adjacent to one of said flaps;
said sheet being folded so as to bring said flaps toward each other;
said plurality of tabs being overlapped and fastened;
means for removably attaching one flap to the other; and
means for removably attaching said strap to the second side of said sheet at a point adjacent the other of said flaps.

28. An insulating jacket as set forth in claim 27 further comprising:
a separate hollow frustum having smaller and larger ends formed from a laminate including a layer of thermally compressible foam; and
a ridge formed on the outside of said frustum.

29. An insulating jacket comprising:
a sheet of laminate including a layer of compressible foam and a skin on at least one surface thereof;
flaps at opposite ends of said sheet;

means adapted for removably attaching said flaps to each other;

a panel having a generally U shaped edge;

means for attaching at least a portion of one side of said sheet to said generally U shaped edge; and a strap extending from a side of said sheet.

30. An insulating jacket as set forth in claim 29 further comprising:

a separate hollow frustum having smaller and larger ends formed from a laminate including a layer of compressible foam; and a ridge formed on said frustum.

31. An insulating jacket for the funnel section of a bottle comprising:

a separate hollow frustum formed from material having a layer of compressible foam adapted to insulate only the funnel section of the bottle; and at least one ridge on said frustum to provide a grip, the foam in the area of said frustum adjacent the ridge being compressed.

32. An insulating jacket for the funnel section of a bottle having a funnel section leading to a spout, a cap that snaps onto the spout, a hinge connecting the cap to a ring secured around the spout so as to prevent the cap from being lost, the said jacket comprising:

an hollow frustum having larger and smaller ends;

means defining a ridge on said frustum;

means defining a notch in said smaller end of said frustum for engagement with said hinge when said hollow frustum is firmly pressed onto said funnel section, whereby said frustum may be mounted coaxially with said funnel section of said bottle.

33. An insulating jacket as set forth in claim 32 wherein:

said frustum is formed from a laminate of compressible foam and a skin, said ridge being defined by compressed adjacent areas.

* * * * *